June 9, 1925.
J. EASKER
HAM BOILING FORM
Filed Nov. 10, 1923
1,541,033
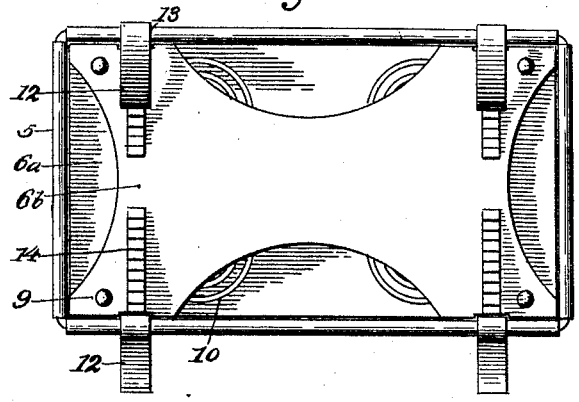
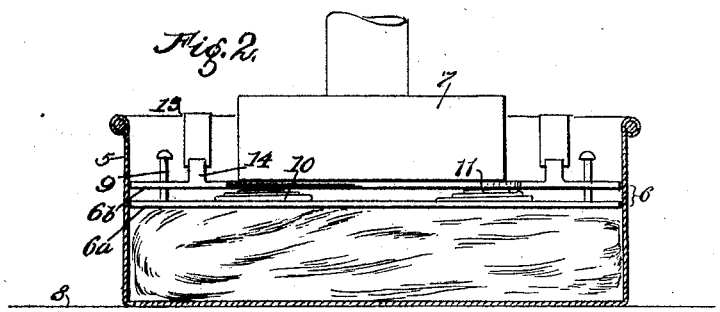
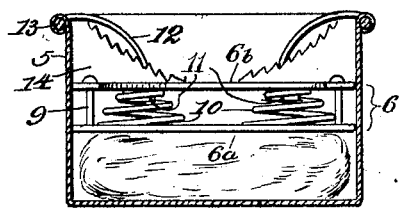
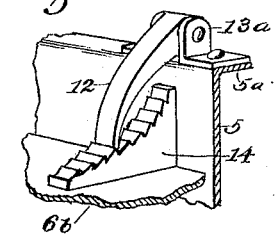
Inventor
John Easker
By J. McH. John
Atty.

Patented June 9, 1925.

1,541,033

UNITED STATES PATENT OFFICE.

JOHN EASKER, OF CEDAR RAPIDS, IOWA.

HAM-BOILING FORM.

Application filed November 10, 1923. Serial No. 673,936.

*To all whom it may concern:*

Be it known that I, JOHN EASKER, a citizen of the United States, residing at Cedar Rapids, in the county of Linn and State of Iowa, have invented certain new and useful Improvements in Ham-Boiling Forms; and I do hereby declare the following to be a full, clear, and exact description of the invention, such as will enable others skilled in the art to which it appertains, to make and use the same.

This invention relates to the preparation of boneless ham, and the like, for the market, by pressing and cooking, the object of the invention being to provide a container for the meat, in which the same may be compactly pressed, and held securely during the cooking process, the device being adapted to automatically maintain pressure on the meat until cooked, notwithstanding the natural shrinkage of the mass during the cooking operation.

The invention is fully disclosed in the description and claims following, reference being had to the accompanying drawing, in which:—

Fig. 1 is a plan view of the boiling form as a whole, one pair of pawls being engaged and the other disengaged. Fig. 2 is a side elevation of the same, the meat receptacle, being in section. Fig. 3 is an end elevation, the receptacle being also in section. Fig. 4 shows a modified container and pawl.

In the drawings, the numeral 5 designates a suitable receptacle for the meat to be pressed and cooked, the meat being usually boneless ham, which is generally boiled by water or steam. Into this the mass of meat is packed so as to practically fill it superficially. It is then desired to subject it to a pressure sufficient to make a compact mass of the meat, which, after cooking, may be sliced, the slices remaining unbroken. The container is therefore provided with a follower 6, fitting slidably inside the container, and to this follower pressure is applied by the ram 7 of a press not shown, the line 8 indicating the surface of the press bed-plate. The follower herein shown is compound, the bottom-plate 6ᵃ being connected, as by guide-pins 9 with a top-plate 6ᵇ, to which the direct pressure is applied. Between these plates are interposed springs 10, held in place by bosses 11. Under pressure the springs yield until the bosses reach the lower plate, when the latter takes the direct pressure of the press. When forced downwardly to the desired limit the upper plate is held to such limit by pawls 12, pivoted near the upper edge of the container, at 13, and engaging toothed ribs 14 of the top-plate by gravity. By reference to Fig. 3 it will be seen that these serrated ribs are formed with an outwardly ascending curve, which the pawls follow as the plate descends, and the plate is thus caught and held by the pawls at any desired level. It will be understood that the upper plate slides on the stationary guide-pins, and is held from detachment from the lower plate by the heads of said pins.

In the preparation of this product it is desirable that the containers have substantially no external projections, to occupy space in the cooking magazine (not shown), and to be liable to breakage in handling. The device is also limited in height, for the sake of space. This is effected by providing for as little vertical thickness of the follower as practicable, allowing for its necessary movement in expanding as the contents of the container shrink. The interposed springs are therefore of the closely collapsing, conical type, which allows the upper and lower plates of the follower to come closely together under the pressure of the ram, when the bosses operate to give the necessary positive pressure on the lower plate. Another means to the same end is the inclination of the serrated ribs, which allows for the use of short pawls, (preferably curved, as shown), which under all conditions engage not far from the sides of the container, and therefore with the best holding leverage.

At the press the operator has nothing to do but place the filled form under the ram, with the pawls turned inwardly, trip the single-revolution press-clutch, and remove the pressed package when the ram lifts. This admits of very rapid work at the press, with resulting economy in preparing the meats for the final boiling.

As above mentioned, and as is well known, meats shrink in volume when boiled. Unless more or less of the initial pressure is maintained during the boiling, the effect of such initial pressure is largely lost by such shrinkage, and instead of a firm, compact body of meat, which can be sliced crosswise in closely adhering slices, the pressed product, especially where folded, presents more or less open seams, which cause the slices to break in pieces, a matter very detrimental to the desirability and saleability of pressed boneless ham. But this is prevented by the automatically expanding follower above described, and the pressed meat, even where folded, may be carved into thin, solid slices, like a solid ham.

It is to be further noted that the meat while boiling is held in a close enclosure, the bottom-plate of the follower fitting so closely to the sides of the container as to almost completely prevent the escape of any juices from the meat. This not only enhances the quality of the product, but tends to minimize shrinkage, the use of the device having effected a very material saving in bulk and weight of product, as compared with other boiling forms.

In Fig. 4 is shown a modification in the construction of the container and pawl. The former is flanged at the top, instead of being wired, as in the other figures, and to the flanges are attached ears 13ª, to which are pivoted the pawls, one of which is shown in said Fig. 4.

Having thus described my invention, I claim:—

1. A ham-boiling form, comprising a parallel-sided container, a follower fitting closely, but slidably, therein, and provided with outwardly ascending serrated ribs, and pawls pivoted near the upper edge of the container, and adapted to engage the notches of the ribs and hold the follower at any desired level.

2. A ham-boiling form, comprising a rectangular, open-topped, parallel-sided container, a follower fitting closely but slidably therein, the follower having top and bottom plates with interposed, closely collapsible springs and bosses for positive engagement of the plates when fully collapsed, the upper plate of the follower having outwardly and upwardly inclined serrated ribs, and pawls pivoted thereover to the top of the container.

In testimony whereof I affix my signature in presence of two witnesses.

JOHN EASKER.

Witnesses:
FRANK S. ZANKA,
J. M. ST. JOHN.